United States Patent [19]

Hart

[11] 4,037,516
[45] July 26, 1977

[54] SAFETY DEVICE AND METHOD

[76] Inventor: Mark M. Hart, 37 Huntleigh Woods, St. Louis, Mo. 63131

[21] Appl. No.: 625,584

[22] Filed: Oct. 24, 1975

[51] Int. Cl.² .............................................. F16B 31/02
[52] U.S. Cl. ..................................... 85/62; 116/114 R
[58] Field of Search ........ 85/62; 116/114 R, 114 AB, 116/114 AC; 73/141 R; 285/93; 29/407

[56] References Cited

U.S. PATENT DOCUMENTS

| 2,572,940 | 10/1951 | Lockhart | 116/114 AB X |
| 2,656,717 | 10/1953 | Fourmanoit | 85/62 X |
| 3,137,268 | 6/1964 | Hornwood | 85/62 X |
| 3,285,120 | 11/1966 | Kartiala | 85/62 |

Primary Examiner—Ramon S. Britts
Attorney, Agent, or Firm—Polster and Polster

[57] ABSTRACT

A safety device includes a shank anchored to a structure, a hollow, annular wafer mounted on and around the shank, a flowable material sealed within the wafer, and a stop member on the shank on a side of the wafer away from the structure, the wafer being constructed to yield at a predetermined pressure generated by relative movement between the structure and the stop to cause flowable material to flow from the wafer.

A method of determining when a predetermined pressure is established between a structure and a stop member on a shank anchored to the structure includes the placing of a hollow, annular wafer around the shank between the structure and the stop member, and expelling from the wafer a detectable flowable material in response to the reaching of a predetermined pressure between the stop member and the structure.

3 Claims, 10 Drawing Figures

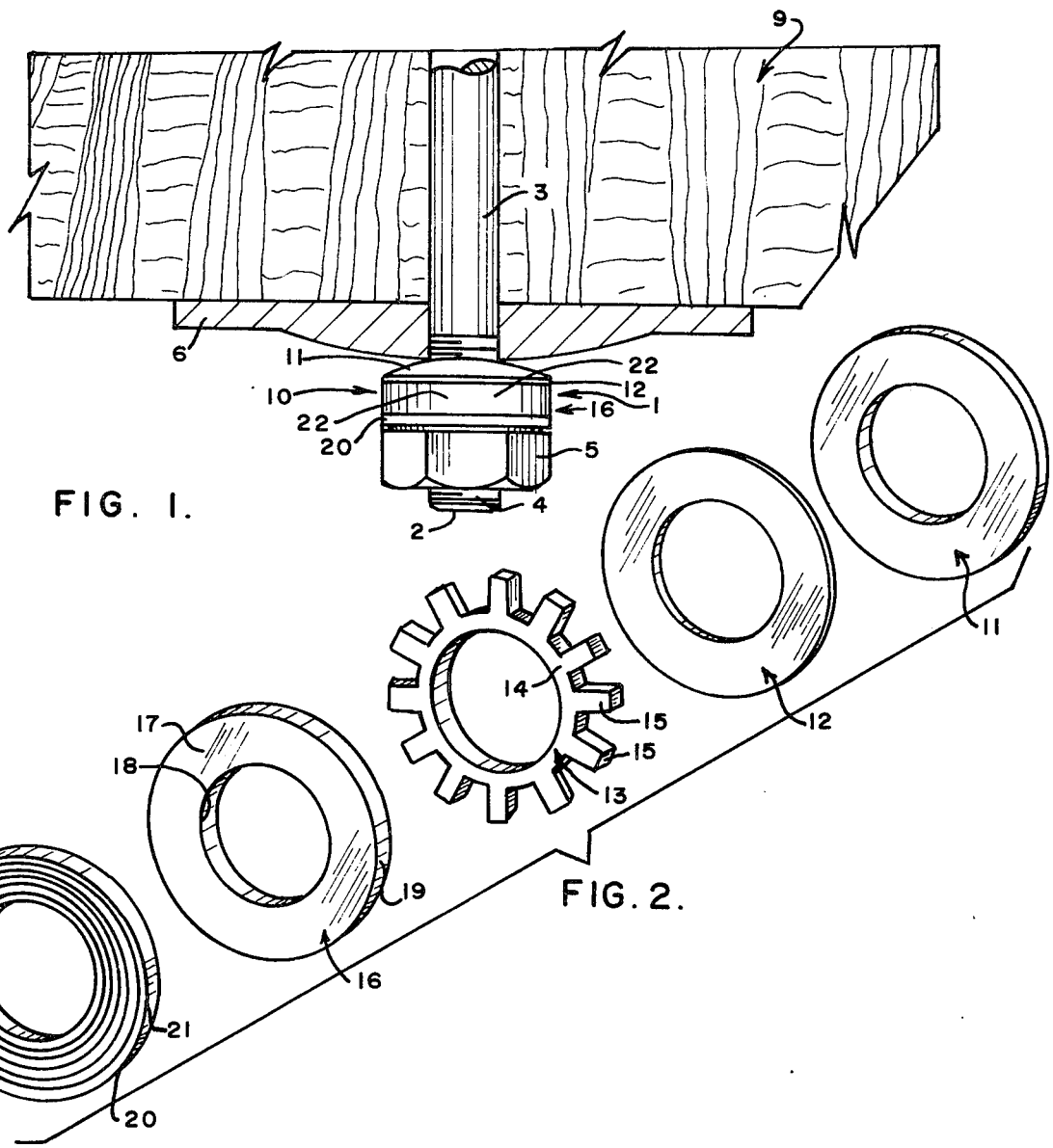
FIG. 1.
FIG. 2.
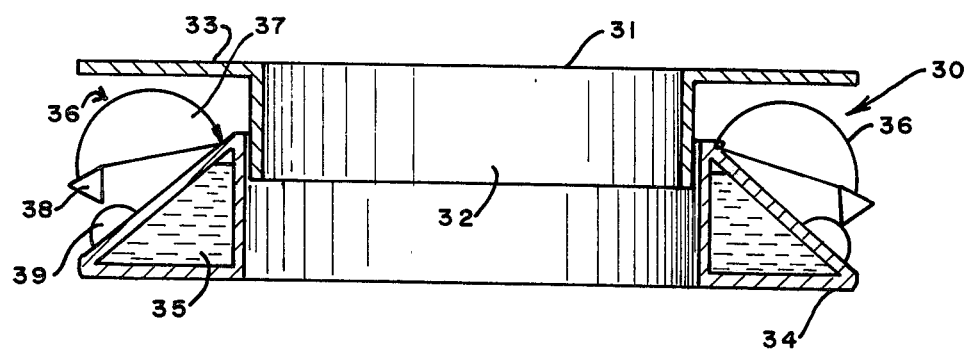
FIG. 3.

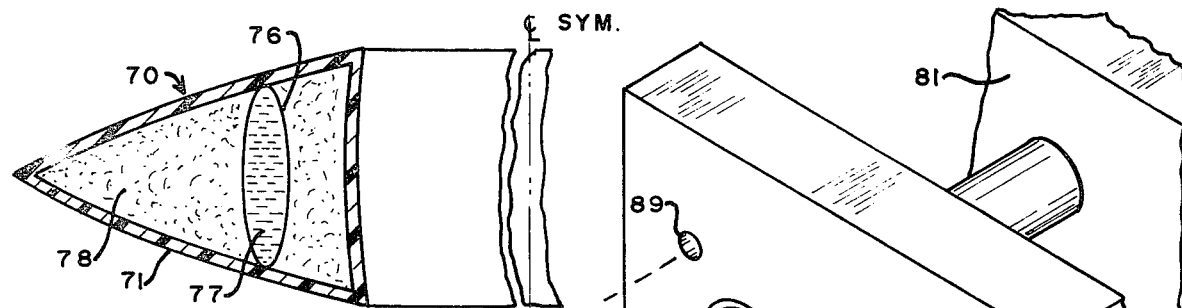
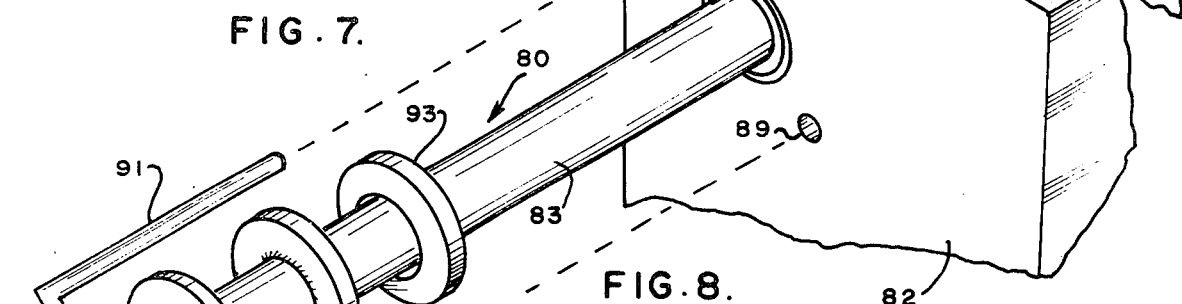
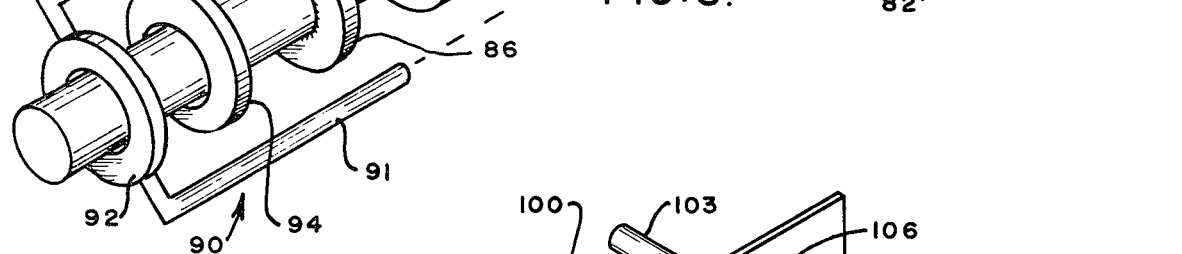
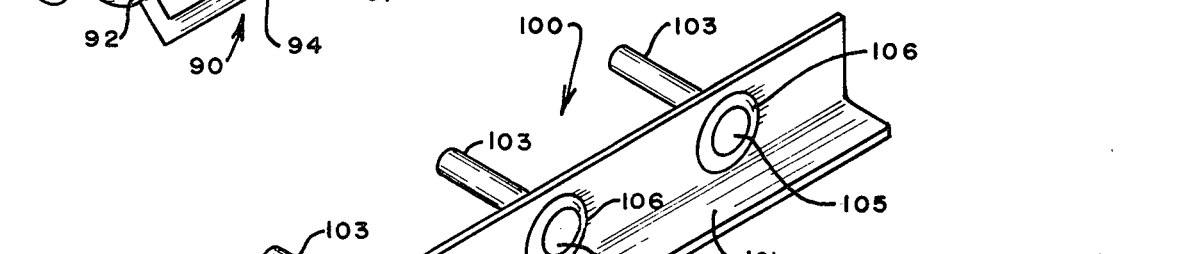
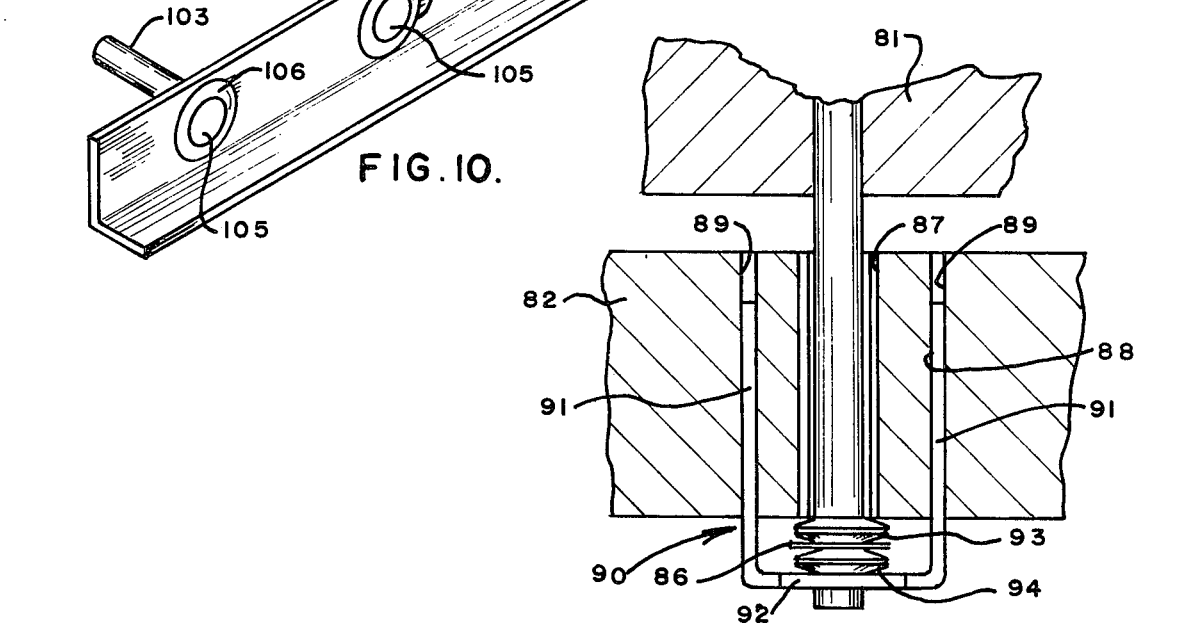

4,037,516

SAFETY DEVICE AND METHOD

BACKGROUND OF THE INVENTION

This invention has application to and great utility in connection with mine roof bolts, although its utility is not confined thereto. For purposes of illustration, the background of the invention will be described in connection with the roof bolting art. If a roof bolt is drawn too tight, the expansion end of the bolt will fracture the surrounding rock, not only loosening its grip but seriously weakening the roof structure. If the bolt is not drawn up tightly enough, it does not give the requisite support to the roof. After the roof bolt is installed, a roof bolt's tension may bleed off, to leave the roof structure largely unsupported, or if the roof structure fails, the bolt will be over-tensioned, leading to falls. Torque wrenches are commonly used to drive the nuts on roof bolts. However, burred or damaged threads or rust or other foreign material on or in the threads can produce false results, since the torque wrench is reading the turning torque or moment of the nut, and not the amount of tension in the shank of the roof bolt. Human error can also lead to over-torquing. Once the roof bolts are installed, there is now no simple way to test the amount of tension in the roof bolt.

One of the objects of this invention is to provide a safety device by which change in pressure between a stop on a shank anchored to a surface, and the surface, is indicated by sight, sound, or smell, or some combination of those.

Another object is to provide such a device and method for its use, which is simple, economical, and reliable.

Other objects will become apparent to those skilled in the art in the light of the following description and accompanying drawings.

SUMMARY OF THE INVENTION

In accordance with this invention generally stated, a safety device is provided comprising a shank anchored to a structure such as a mine roof or a girder, a hollow, annular wafer mounted on and around the shank, a flowable material sealed within the wafer, and a stop member on the shank on a side of the wafer away from the structure, the wafer being constructed to yield at a predetermined pressure generated by relative movement between the structure and the stop member, to cause flowable material to flow from the wafer.

A method of determining when a predetermined pressure is established between a structure and a stop member on a shank anchored to the structure includes placing a hollow, annular wafer around the shank between the structure and the stop member, and expelling from the wafer a detectable flowable material in response to the reaching of a predetermined pressure between the stop member and the structure.

BRIEF DESCRIPTION OF THE DRAWINGS

In the drawings,

FIG. 1 is a fragmentary view, partly in section, of one embodiment of safety device of this invention, employed as a roof bolt assembly;

FIG. 2 is a perspective exploded view of parts of the device shown in FIG. 2;

FIG. 3 is a sectional view of another embodiment of safety device of this invention;

FIG. 7 is a fragmentary sectional view of the wafer part of still another embodiment of safety device of this invention;

FIG. 8 is a fragmentary view in perspective of still another embodiment of safety device of this invention;

FIG. 9 is a sectional view showing the device of FIG. 8 in assembled condition; and FIG. 10 is a view in perspective of devices of this invention as applied to structural steel members.

DESCRIPTION OF THE PREFERRED EMBODIMENTS

Figure 4:
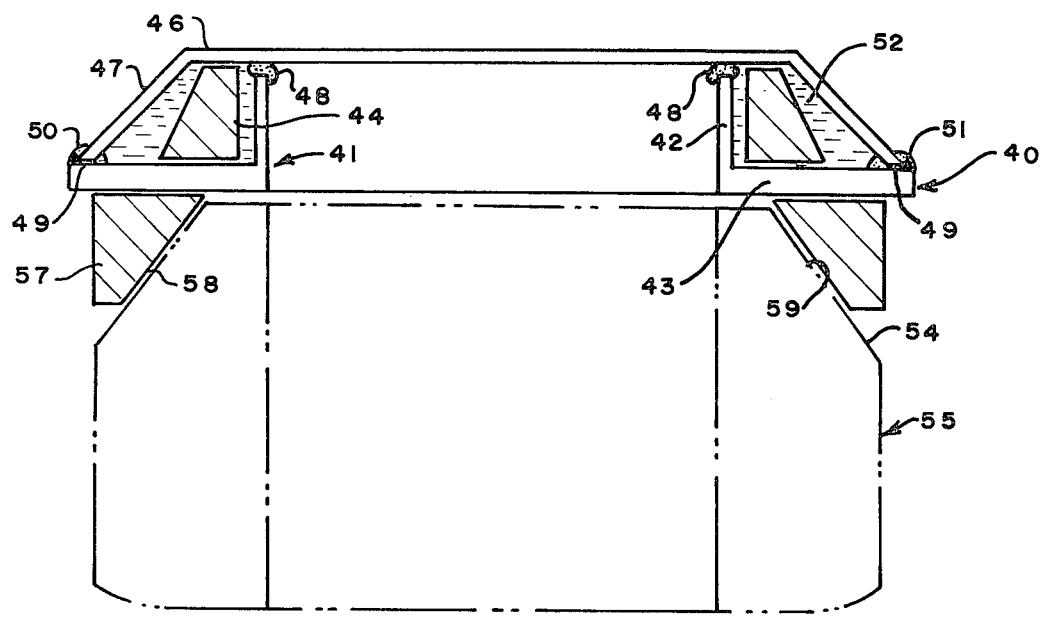
FIG. 4 is a sectional view of still another embodiment of safety device of this invention.

Referring now to FIGS. 1 and 2 for one embodiment of safety device of this invention, reference numeral 1 indicates a device of this invention applied to a roof bolt 2 with a shank 3, which is anchored at its upper end by the usual expansion anchor, not here shown, in a structure 10, which, in this example, is a stratum of rock constituting the roof of a tunnel. The shank 3 has a threaded section 4 at its lower end, upon which a nut 5 is mounted.

A roof support plate 6 is mounted on the shank 3, and bears against the underside of the roof. All of the elements thus far described are conventional.

Mounted between the roof support plate 6, which constitutes part of the structure in this illustration, and the nut 5, which constitutes a stop member in this embodiment, is an annular wafer assembly 10. In this embodiment, the wafer assembly 10 includes a hard steel domed annular top cap 11, a soft metal, plastic, or reinforced plastic closure member 12, a spider 13, of ceramic, brittle reinforced plastic, brittle metal, or composite material, of such a character as to crush at a given predetermined compressive load, a cup 16 which can be made of the same material or type of material as the closure member 12, and a bearing washer 20.

In the embodiment shown, the spider 13 has a ring 14, with spaced radially extending spokes or ribs 15. The cup 16 has a flat annular bottom 17, and inner and outer cylindrical side walls 18 and 19, respectively. Bearing washer 20 has multiple concentric serrations 21 on one or both of its broad surfaces, to reduce friction between the outer face of the bearing washer and the inner face of the nut 5 which bear upon one another. The outer rim 18 of the cup 16 may be provided with scoring areas 22, providing points or lines of weakness to facilitate rupturing at the appropriate time.

In assembling the wafer 10, the spider 13 is placed within the cup 16, the spaces between the spokes 15 are filled with a liquid paint or dye and the closure 12 is sealed fluid tightly to the outer edges of the side walls 18 and 19 defining the open top of the cup 16, to form a completely encapsulated unit.

The wafer unit can be used in either of two ways, to establish a proper predetermined tension in the roof bolt when it is installed, or to detect an overload after it is installed. In either event, the assembly of top cap, wafer, and bearing washer is mounted on the shank 3 between the roof support plate 6 and the nut 5, and the nut 5 is tightened. If the wafer assembly is intended for use to establish the proper tension in the roof bolt at its installation, the spider 13 is of such strength that it yields or crushes upon the attainment of the proper compressive force between the inner face of the nut 5 and the roof support plate 6. The collapse of the spider 13 compels the collapse and rupture of the outer side wall 19, and the expulsion of the paint or dye. This gives an immediate visual indication of the reaching of the desired tension. The nut can then be turned through as many fractions of a revolution or revolutions as is necessary to compensate for the collapse of the spider. It can be seen that the tension indicated by the collapse of the wafer envelope and the subsequent turning of the nut represents the true tension in the shank of the roof bolt, and not merely a turning torsion in the nut.

In using the wafer assembly as an over-tension indicator, the spider 13 is made to crush at a compressive load greater than the load achieved in installation, but to yield at a compressive load beyond which the tension in the roof bolt becomes dangerous. Under the circumstances, the roof bolt can be installed to the proper installation tension by means of the usual torque wrench, or preferably, by the use of two of the wafer envelopes, one containing a spider adapted to yield at the proper intial tensioning level, and the other at the over-tensioning level. The two capsule units can be separated by an intermediate washer.

When two wafer capsules are used, they can be filled with paint or dye of different colors. The paint or dye can be pressurized, and even a finely divided dry pigment can be used if desired. The capsules can be color coded or otherwise clearly distinguished to facilitate their proper use. With either one or two capsules, the top cap and outermost bearing washer can be made of a somewhat larger diameter than the cup 16 and the nut 5, and one of the top cap and bearing washer can be provided with one or more axially projecting fingers at its outer edge while the other can be provided with channel-notches positioned and proportioned complementarily slidably to receive the finger or fingers. A drop of solder or adhesive can then be used at the edge of the notch and finger to hold the package of top cap, wafer unit or units, and bearing washer or washers together, to facilitate handling and use. This arrangement also precludes relative rotation between the top cap and the outermost bearing washer, which ensures that no twisting strain is put upon the wafer capsule during the installation of the roof bolt. The adhesive by which the unit is held can be of a type of negligible to shear as compared with the forces exerted axially on the top cap and bearing washer by the nut and roof support plate.

Referring now to FIG. 3 for a different embodiment of safety device, one which corresponds to the relaxation of tension in a shank, reference numeral 30 indicates a wafer assembly which includes a flanged bushing 31 with a cylindrical sleeve-like body 32 and a radially outwardly extending annular flange 33, and a wafer 34. The wafer 34 includes a wafer casing 35, constructed of soft metal, plastic, reinforced plastic or composite material, which is hollow, fluid tight, annular, and triangular in cross section, as indicated in FIG. 3. Paint or liquid dye 35 under gas pressure, is sealed inside the wafer casing 34. At spaced intervals around the wafer casing 34, prong assemblies 36 are hinged to the casing near the apex of the casing, as shown in FIG. 3. Each of the prong assemblies includes a prong arm 37, hinged at one end to the casing, and carrying at its other end a prong 38. The prong arm is solidly arched intermediate its ends, to provide a cam surface facing the underside of the flange 33 of the bushing 31. The prong can be conical, and should be sharp pointed. A bead of non-hardening sealant, either in the form of a continuous bead or a hemispherical mound is positioned between the point of each prong and the surface of the wafer casing against which the prong moves when it is rotated toward the casing about the pivot point of the hinge arm.

A bearing washer, of the type shown in FIGS. 1 and 2, is also employed, mounted about a shank extending through the cylindrical body 32, below the base of the casing 34.

In this embodiment, when a nut or other stop member is tightened against the bearing washer, the wafer casing is moved toward the flange 33, causing the under surface of the flange 33 to bear upon the arched camming surface of the prong arm 37, driving the prong towards the casing, through the bead of sealant, and finally piercing the casing. However, the sealant 39 prevents the escape of the liquid 35 while the prong is in place, the prong acting as a stopper. The length of the body 32 of the bushing 31 is such that the lower edge of the body butts against the facing surface of the bearing washer, transmitting the compressive force between the stop member and the support independently of the wafer casing 34, which performs no real load bearing function. As can be seen from FIG. 3, the body 32 fits loosely within the casing 34.

In the operation of this embodiment of wafer, if the tension in a shank upon which the wafer is mounted, relaxes to the place at which even a slight axial movement of the bearing washer and casing 34 from the flange 33 occurs, the force of the propellant gas within the casing 34 will dislodge the prong sufficiently to permit the liquid 35 to escape, giving an immediate visual sign that the tension has been relaxed.

Figure 5:
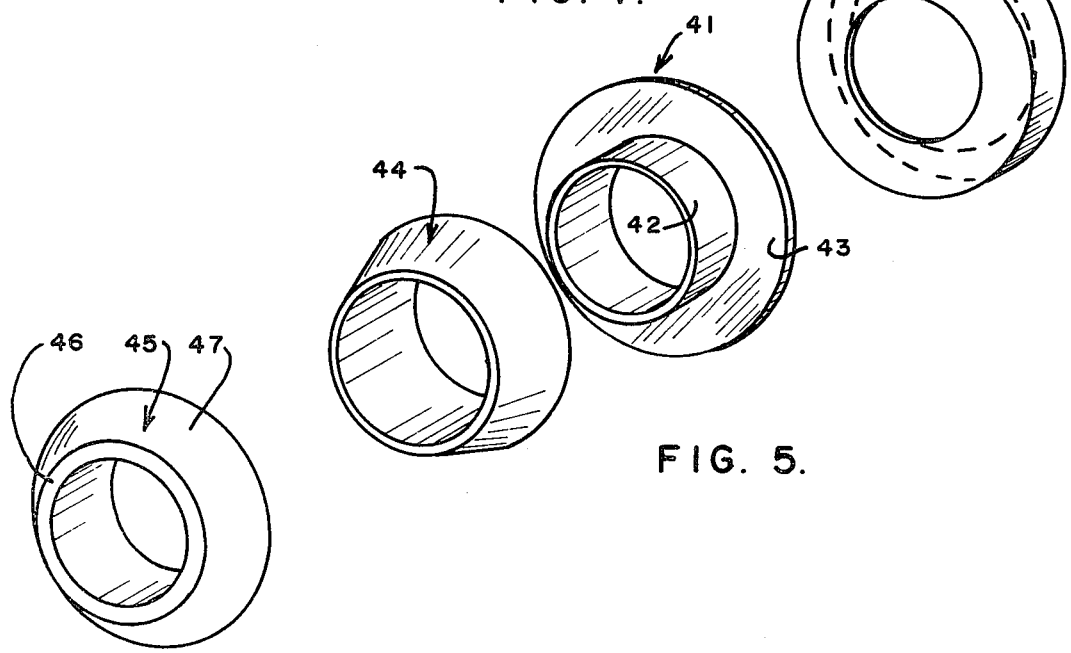
FIG. 5 is an exploded view in perspective of parts of the device shown in FIG. 4.

Referring now to FIGS. 4 and 5 for still another embodiment of safety device of this invention, reference numeral 40 indicates an assembled wafer. The wafer 40 of this embodiment includes a flanged bushing 41, with a cylindrical sleeve section 42 and an outwardly radially extending flange 43; an annular crush ring 44, trapezoidal in cross section, and of a size to fit loosely about the sleeve 42 and a height to project a substantial distance beyond the outer edge of the sleeve 42; and a cap 45 of metal, plastic, or composite material, which is also annular, with a planar radially extending outer wall 46, and outwardly sloping side wall 47. A heavy bead of elastic sealant 48 seals the gap between the outer wall 46 and the outer edge of the sleeve 42, as indicated in FIG. 4, even when the inner surface of the wall 46 and the upper edge of the sleeve 48 are not in immediate contact. A gasket 49 is mounted between the outer edge of the side wall 47 and the facing surface of the flange 43. A bead of frangible sealant 50, in which a tear wire 51 is embedded, serves as a temporary seal. The tear wire 51 has a protruding end, not here shown, which may be grasped by one's fingers or a plier.

Pressurized paint or pigment 52 is contained within the capsule defined by the bushing 41 and cap 45.

The illustrative embodiment of wafer assembly shown in FIGS. 4 and 5 is adapted, as will be explained, to respond either to over-tensioning or bleed off of the tension in a shank. It is not intended for use as a means of establishing the desired tension, although it could be used for that purpose. In FIG. 4, a pop ring 57, of ceramic, brittle metal, brittle plastic or composite material is provided as the initial tension-establishing device. The pop ring 57 is trapezoidal in cross section, with an inner sloping face 58, preferably coated with Teflon 59, to reduce the turning friction between the face 58 and an engaging sloping face 54 of a nut 55, which constitutes the stop member in this embodiment.

In the operation of this embodiment of safety device, the wafer is assembled as indicated, mounted on the shank to be tensioned, with the pop ring 57 and the nut 55 mounted as shown in FIG. 4. As the nut is screwed onto the threaded end of the shank, the upper surface of the pop ring 57 engages the lower surface of the flange 43, and the outer wall 46 of the cap 45 bears against the support to which the shank is anchored. Because the crush ring 44 projects above the upper edge of the sleeve 42, the compressive force between the pop ring 57 and the support is borne by the crush ring 44. When the desired tension has been attained, the pop ring 57 will break, with an audible sound and a visual indication that the proper tension has been reached. As in the embodiments involving the crushing of a wafer at the desired installing tension, the nut may be turned through a predetermined fraction of a turn or turns to achieve the desired final tensioning. The protruding end of the tear wire 51 is then grasped and the wire torn off all the way around the flange. The compressive force of the support now holds the cap 45 tightly against the gasket 49, to keep the pressurized liquid 52 inside the wafer envelope.

If the tension in the shank exceeds a predetermined limit, the crush ring 44 will yield, causing the side wall 47 to cam outwardly and release the pressurized liquid. If the tension in the shank relaxes to the place at which the compressive force between the edge of the side wall 47 and the gasket 49 is insufficient to contain the pressurized liquid, the pressurized liquid will escape. In either event, there will be a visual indication that a dangerous condition exits. As is the case with the other embodiment described heretofore and hereafter, a foaming liquid can be employed to mark its escape more noticeably.

Figure 6:
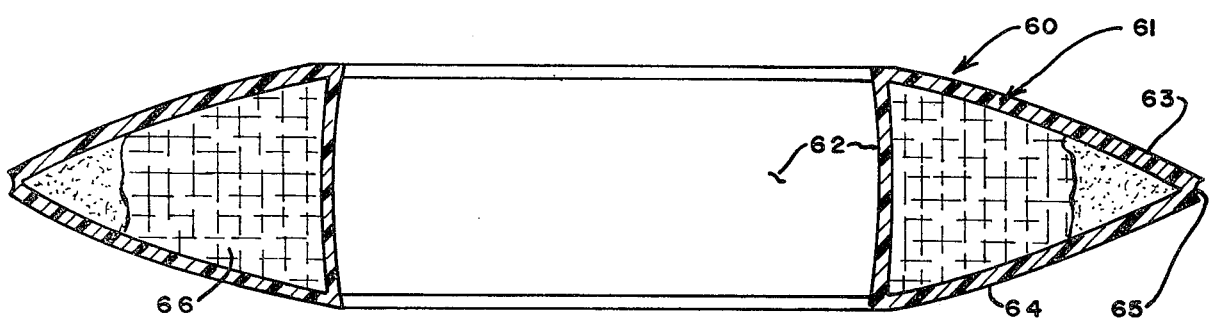
FIG. 6 is a sectional view of still another embodiment of safety device of this invention.

Referring now to FIG. 6 for still another embodiment of safety wafer of this invention, reference numeral 60 indicates a non-load supporting safety wafer which has a casing 61 made of a soft metal, plastic, or the like. The casing 61 in this embodiment is made up of a bowed annular inner wall 62, and side walls 63 and 64 integral with the inner wall 62 and sealed at their radially outer edges, either integrally with one another or by means of a suitable sealant, along a circumferential line of weakness 65. The casing 61 is ogival in cross section as shown in FIG. 6, is hollow, and is filled with paint or dye 66 under pressure.

In all of the embodiments described heretofore, when the paint or pigment has been described as being under pressure, it is understood that any of the common propellants such as are used in the commercially available, "aerosol" type spray paints, can be used.

The use of the safety wafer shown in FIG. 6 will be described in conjunction with the embodiment shown in FIG. 7, because the embodiment shown in FIG. 7 is a variation of that shown in FIG. 6.

Referring now to FIG. 7 for still another embodiment of safety wafer of this invention, reference numeral 70 represents the complete wafer, which has a casing 71 which can be identical with the casing 61 of the embodiment shown in FIG. 6. Within the casing 71, there is an annular, fluid tight envelope 76, containing a liquid 77. The envelope 76 is easily rupturable, and the liquid 77 is a reactant, which is designed to react with material 78 filling the rest of the hollow casing 71. The material 78 can be liquid or powder depending upon the nature of the reaction to be caused between the liquid 77 and the material 78. The reactants can be such such as to create bioluminescence, for example, when the casing 71 can be made of transparent flexible plastic and not readily rupturable, so that only the envelope 76 ruptures upon compression of the casing, to cause the capsule to glow brightly when the envelope is ruptured. On the other hand, the reactants can be of a more simple nature, such as acid in the envelope 76 and sodium bicarbonate mixed with dye and a foaming agent in the rest of the casing, to generate pressure when the envelope is ruptured and so to rupture the casing.

FIGS. 8, 9 and 10 illustrate devices in which the safety wafers of FIGS. 6 and 7 may be used.

Referring now to FIGS. 8 and 9, reference numeral 80 indicates a safety device designed to detect and signal relative movement toward and away from one another of two structures, such, for example, as the shell of a vehicular tunnel and the overlying rock. In this embodiment, reference numeral 81 indicates a far structure such as a rock stratum, and reference numeral 82, a near structure, such as the shell of a tunnel. A shank 83 is anchored at its one end in the structure 81, and extends through a Teflon lined metal bushing 88 in a passage 87 in the structure 82. In this embodiment, the shank 83 has no head on its outer end, but does have a collar 86 either integral with the rod or welded or otherwise secured to the rod. A wafer 93 which may be either of the types illustrated in FIG. 6 or FIG. 7, is mounted on the shank 83 between the collar 86 and the lower edge of the bushing 88. Another safety wafer 94, of the same general type as the wafer 93 is mounted on the shank 83 between the outer broad face of the collar 86 and an inner face of a ring 92 which forms a part of a yoke 90. The ring 92 is slidably mounted around the shank 83, and is held in position against the wafer 94 by L-shaped legs of the yoke 90, which are integral with or secured to the ring 92, and project into and are anchored within holes 89 in the structure 82. The legs 91 can be cemented in or driven into the holes 89, but in any event they are securely fastened therein.

When a device of this embodiment is fully assembled as shown in FIG. 9, it can be seen that if the structure 81 moves toward the structure 82, the lower of the wafers 94 will be crushed between the collar 86 and the ring 92. If the structure 82 moves away from the structure 81, the upper wafer 93 will be crushed between the lower end of the bushing 88 and the collar 86. Thus, not only is relative movement of the two structures signalled, but also how the structures are shifting.

Referring now to FIG. 10 for still another embodiment of device utilizing a wafer of the type shown in either FIG. 6 or FIG. 7, reference numeral 100 indicates the assembled device, which consists of an angle iron 101, with holes in one leg, through which shanks 103 extend slidably. In this embodiment, the shanks have heads 105. Mounted on the shanks between a face of the leg of the angle iron 101 through which the shanks project and the head 105 of each shank, is a wafer of the type shown in either FIG. 6 or FIG. 7. The shanks 103 are secured to any structure which may be subject to a bending moment, or to a structure in which one member is likely to shift with respect to another. Any such movement which will place a compressive load between the head 105 and the face of the angle iron leg, will result in the rupturing of one or more wafers, which will in turn spray paint or pigment or dye where it will be immediately apparent.

Numerous variations in the construction and method of use of the safety device of this invention, within the scope of the appended claims, will occur to those skilled in the art in the light of the foregoing description. Merely by way of illustration, the wafer can be made to emit an audible sound, or a distinctive odor when it is ruptured or a radioactive material which can be detected after the wafer casing, which, in that case, can be made of a shielding material, is ruptured. A crush ring or other member which, like the crush rings of the illustrative embodiments described, is constructed to yield at a load predetermined within acceptable limits, may be positioned externally of the wafer, either as a sort of bushing or as a sort of rim. In this way, a wafer of the "soft" type such as shown in FIGS. 6 and 7 can be used in a load supporting application. In such a construction, the top cap and bearing washer can be adhered to the crush ring, to form a unitary package. In embodiments in which such a construction is feasible, a spline or feather arrangement between the tightening nut or outer washer member and a top cap or washer can be provided to prevent relative rotation of the members while the nut is being tightened. These variations are merely illustrative.

Having thus described the invention, what is claimed and desired to be secured by Letters Patent is:

1. A safety device for detecting and signaling relative movement of near and far parts of a structure both toward and away from one another, comprising a shank extending slidably through said near structure part and having one end anchored in said far structure part, and another, outer, end projecting beyond said near structure, said shank having a stop in the form of an annular collar on its said projecting part but spaced toward the near structure part from the outermost end of the said shank, a first annular wafer mounted on and around said shank between said collar and said near structure part, said first wafer being hollow, rupturable, and having a flowable material sealed within it, a leg secured only to said near structure part and carrying a ring, slidably mounted around the said outer end of said shank and spaced from said collar, and a second annular wafer mounted on and around said shank between said ring and said shank collar, said second wafer being hollow, rupturable, and having a flowable material sealed within it, whereby relative movement of said collar in a direction toward said near structure part will compress said first wafer between said collar and said structure, and relative movement of said collar in a direction away from said near structure part will compress said second wafer between said collar and said ring.

2. A method of indicating relative movement between a shank anchored at one end in a part of a structure, said structure having a surface beyond which an outer end of said shank projects, and said shank, said shank having on its projecting part a stop member, comprising mounting on said shank contiguous said stop member at least one wafer assembly comprising an annular hollow wafer having at least one rupturable part and containing a flowable material sealed within said wafer, and thereafter moving said stop member and structure surface relative to one another in the direction away from one another, rupturing at least one wafer and expelling said flowable material.

3. The method of claim 2 wherein the said stop member is spaced from a free end of the shank, including the steps of extending said shank slidably through an associated structure, mounting on said shank on the side of said stop member opposite said structure and a second annular hollow wafer having at least one rupturable part and containing a flowable material sealed within said wafer, and anchoring in said associated structure a leg secured to a ring slidably mounted on said shank, said second annular wafer being sandwiched between said ring and said stop member.

* * * * *